2,191,778

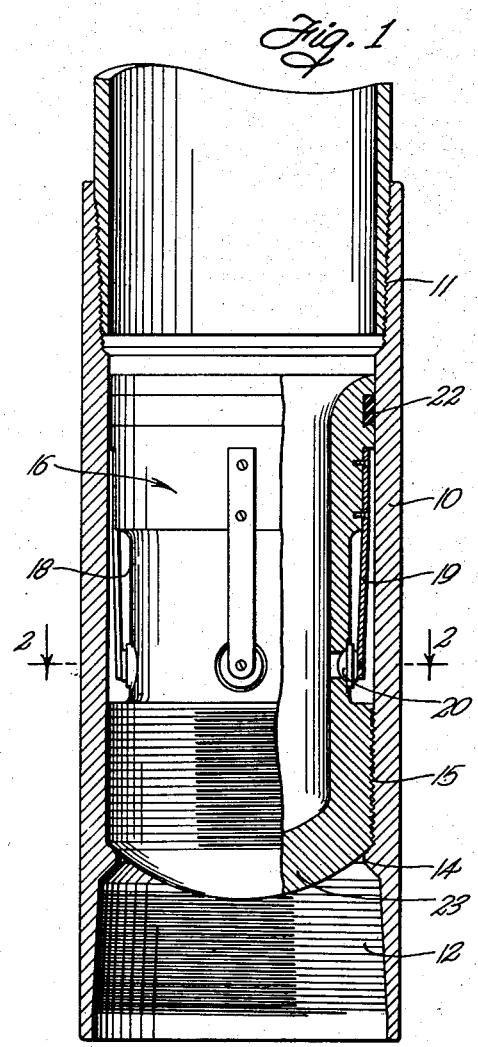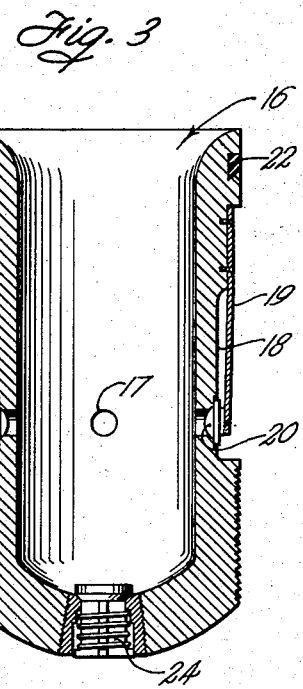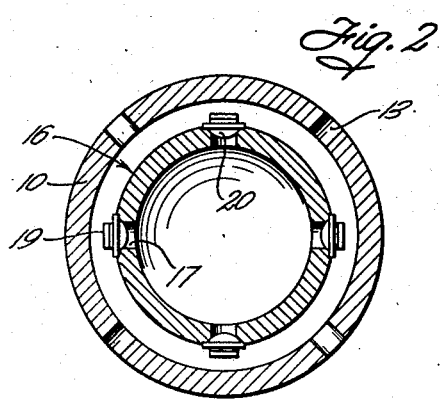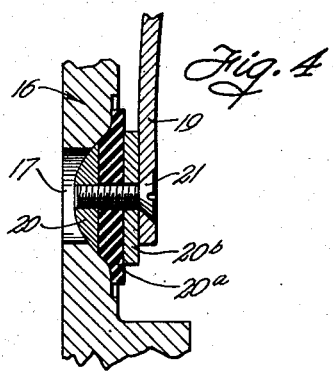
Inventor
KENNETH H. SWART
By Hazard & Miller
Attorneys Patented Feb. 27, 1940

UNITED STATES PATENT OFFICE 2,191,778

BACK PRESSURE VALVE

Kenneth H. Swart, Whittier, Calif., assignor to Security Engineering Co., Inc., Whittier, Calif., a corporation of California Application September 14, 1939, Serial No. 294,818

10 Claims. (Cl. 166—1)

This invention relates to improvements in back pressure valves used for cementing casings, liners, and the like in wells such as oil wells.

Heretofore back pressure valves have been devised for maintaining the pressure at which the cement was forced out of the casing or liner as the case may be and preventing reverse flow into the casing or liner wherein the valves are mounted on the exterior of the ported collar or other structure through which the cement is discharged. In some instances these valves have been recessed in the exterior of the ported collar or other structure. It is found, however, that with the valves externally mounted there is danger of injuring them upon lowering the casing or liner into the well so that they will not seat properly to prevent reverse flow when the discharge of cement is discontinued. Even when the valve is recessed it not infrequently occurs that mud or other detritus enters the recesses or otherwise damages the valves and prevents their functioning properly.

An object of the present invention is to provide an improved back pressure valve wherein the check valves which prevent reverse flow through the ported collar or other structure are adequately protected against injury on lowering the device into a well for the purpose of cementing. The invention contemplates a means for providing an external sleeve within which there is a valve-holding or valve-supporting bushing on which the valves are mounted, these valves being fully protected by the surrounding sleeve. The bushing is preferably formed of readily drillable material so that it may be drilled up upon completion of the cementing.

More specifically, another object of the invention is to provide a means for holding the bushing against rotation within the sleeve within which it is mounted so that on drilling up the bushing there is no danger of its merely being caused to turn within the sleeve which would hinder the drilling.

With the foregoing and other objects in view, which will be made manifest in the following detailed description and specifically pointed out in the appended claims, reference is had to the accompanying drawing for an illustrative embodiment of my invention, wherein:

Figure 1 is a vertical section through the outer sleeve or collar illustrating the bushing therein, part of the bushing being shown in elevation and the remainder being broken away and shown in vertical section;

Fig. 2 is a horizontal section taken substantially upon the line 2—2 upon Fig. 1;

Fig. 3 is a vertical section through a valve-supporting bushing embodying a slightly different form of design; and Fig. 4 is a partial view in vertical section illustrating one of the back pressure check valves.

Referring to the accompanying drawing wherein similar reference characters designate similar parts throughout, the improved back pressure valve comprises an outer sleeve 10 which may be in the form of a steel collar or a section of flush joint casing. In the case of a liner it may be either a collar or a section of the liner which, in turn, either may or may not be formed of readily drillable material. In the construction shown in Fig. 1, the sleeve is in the nature of a collar threaded at both ends as at 11 and 12 to enable its being incorporated in a string of casing or liner. The sleeve is equipped with a plurality of radial ports 13 and adjacent its bottom it is provided with a small internal shoulder 14 above which it is internally threaded as at 15. Within the sleeve there is disposed a valve-supporting bushing generally indicated at 16, which is preferably formed of readily drillable material, such as for example aluminum or an alloy of aluminum such as that now known in the trade under the trade-name Securaloy. This bushing is in the nature of a tubular body having its lower end externally threaded to enable its being screwed into sleeve 10 and tightened therein against shoulder 14. It is equipped with a plurality of ports 17 which, when the parts are assembled, are preferably, but not necessarily, disaligned with respect to ports 13 as shown in Fig. 2.

On the exterior of the bushing there is formed an annular groove or channel 18 arranged opposite ports 13 and placing these ports in communication with port 17. Above this channel the exterior of the bushing is externally reduced to provide for the attachment of downwardly extending springs 19 which are disposed largely within the channel 18. Each spring 19 carries a button 20 which together with its associated rubber washer 20a, constitutes an outwardly-opening, inwardly-closing check valve adapted to seat in ports 17 to permit outward flow therethrough but preventing reverse flow. These buttons may be attached to the ends of the springs by means of screws 21 which extend through holes in the springs rather loosely so that the buttons or valves have a small floating action with respect to their springs and on seating may accommodate themselves to the seats at the outer ends of the ports 17. Between each rubber washer and its respective spring there is preferably a metal washer 20b. The rubber washer has a comparatively flexible peripheral lip designed to seat on a flat seat formed on the exterior of the bushing. The arrangement is such that the rubber washer is normally caused to engage its seat slightly in advance of the seating of the metal button 20 as the valves move from open to closed position. This form of construction is preferable in that leakage is prevented and the valves are caused to close even when there exists only slight back pressures.

In the top of the bushing there is formed a groove designed to receive packing 22, such as for example chevron packing, which will effectively seal the top of the bushing and the top of the sleeve against leakage therebetween.

In the form of construction shown in Fig. 1, the bottom of the bushing is closed as by a baffle 23 permitting the casing to be floated into the well. In the construction shown in Fig. 3 this baffle is equipped with a valve 24 which is upwardly opening to permit entry of fluid while the structure is being lowered into the well and which is downwardly closing so that when cement is forced downwardly through the casing it will be stopped by this valve and caused to be discharged through ports 17 and 13. In some forms of construction the baffle may be omitted entirely. That is, the interior of the bushing may be opened at its bottom as well as at the top. Such a construction may be employed where other means is present to cause the cement to be forced outwardly through the ports.

The type of check valve shown which is made up of the springs 19 and the buttons 20 is that type which is generally referred to in this art as a "saxophone valve". It will be noted that in the present construction these "saxophone valves" are completely protected by the surrounding sleeve 10 so that when the device is lowered into the well there is no danger of these valves being damaged. With the ports 13 and 17 disaligned even if the ports 13 should be plugged by mud, such as by scraping the walls of the well when the structure is being lowered into position the mud or formation which plugs the ports does not have an opportunity to damage these "saxophone valves". Upon forcing fluid downwardly through the casing or cementing string any plugging mud that may be present will be forced back out through the ports 13. The construction thus is such that no opportunity for material to lodge underneath the valves to prevent their seating properly is afforded. Consequently, the valves are always free to seat to prevent reverse flow through the structure when the discharge of cement is discontinued.

When the discharged cement has set the bushing is intended to be drilled up to leave the casing or liner as the case may be free or open for further operations. As the bushing is tightened against the shoulder 14, it is manifest that it cannot rotate within the sleeve while being drilled up. Also, it is impossible to bodily force the bushing through the sleeve because of the presence of the shoulder. In this way, there is assurance that the bushing and its associated parts can be completely reduced to small cuttings which can be flushed out of the well by the circulation fluid to leave the casing or liner clear for further operations.

Various changes may be made in the details of construction without departing from the spirit or scope of the invention as defined by the appended claims.

I claim:

1. A back pressure valve for cementing casings, liners, and the like comprising means providing an outer ported sleeve, a drillable ported valve-holding bushing therein, and outwardly-opening, inwardly-closing check valves on the bushing for opening and closing the ports in the bushing, said check valves being arranged between the bushing and the sleeve so as to be protected by the sleeve when the device is lowered into a well.

2. A back pressure valve for cementing casings, liners, and the like comprising means providing an outer ported sleeve, a drillable ported valve-holding bushing therein, and outwardly-opening, inwardly-closing check valves on the bushing for opening and closing the ports in the bushing, said valves being in the form of springs secured to the bushing and carrying buttons adapted to seat in the ports in the valve holder, the buttons and springs being arranged between the bushing and sleeve so as to be protected by the sleeve when the device is lowered into the well.

3. A back pressure valve for cementing casings, liners, and the like comprising means providing an outer ported sleeve, a drillable ported valve-holding bushing therein, and outwardly-opening, inwardly-closing check valves on the bushing for opening and closing the ports in the bushing, said check valves being arranged between the bushing and the sleeve so as to be protected by the sleeve when the device is lowered into a well, the ports in the sleeve and bushing being disaligned.

4. A back pressure valve for cementing casings, liners, and the like comprising means providing an outer ported sleeve, a readily drillable ported valve-holding bushing in the sleeve, there being an external annular channel in the bushing opposite the ports therein and opposite the ports in the sleeve, springs mounted on the bushing and disposed in the channel, and buttons on the springs adapted to seat in and close the ports in the bushing against inward flow therethrough.

5. A back pressure valve for cementing casings, liners, and the like comprising means providing an outer ported sleeve, a readily drillable ported valve-holding bushing in the sleeve, there being an external annular channel in the bushing opposite the ports therein and opposite the ports in the sleeve, springs mounted on the bushing and disposed in the channel, and buttons on the springs adapted to seat in and close the ports in the bushing against inward flow therethrough, said buttons being loosely mounted upon the springs.

6. A back pressure valve for cementing casings, liners, and the like comprising means providing an outer ported sleeve, a readily drillable ported valve-holding bushing in the sleeve, there being an external annular channel in the bushing opposite the ports therein and opposite the ports in the sleeve, springs mounted on the bushing and disposed in the channel, and buttons on the springs adapted to seat in and close the ports in the bushing against inward flow therethrough, packing means on the bushing above the channel, the bushing below the channel being threaded into the sleeve, there being a shoulder in the sleeve against which the bushing may be tightened to prevent rotation of the bushing in the sleeve while it is being drilled up.

7. A back pressure valve for cementing casings, liners, and the like, comprising means providing a ported sleeve, a drillable ported valve-holding bushing in the sleeve having ports arranged to supply cement to the ports in the sleeve, inwardly closing check valves for the ports in the bushing, there being a shoulder on the sleeve against which the bushing may tighten to prevent rotation of the bushing while it is being drilled up.

8. A back pressure valve for cementing casings, liners, and the like comprising means providing an outer ported sleeve, a drillable ported valve-holding bushing therein, outwardly-opening, inwardly-closing check valves on the bushing for opening and closing the ports in the bushing, said check valves being arranged between the bushing and the sleeve so as to be protected by the sleeve when the device is lowered into a well, and means for preventing downward flow through the bushing.

9. A back pressure valve for cementing casings, liners, and the like comprising means providing an outer ported sleeve, a drillable ported valve-holding bushing therein, outwardly-opening, inwardly-closing check valves on the bushing for opening and closing the ports in the bushing, said check valves being arranged between the bushing and the sleeve so as to be protected by the sleeve when the device is lowered into a well, and means for preventing downward flow through the bushing, but permitting upward flow therethrough.

10. A back pressure valve for cementing casings, liners, and the like comprising means providing an outer ported sleeve, a ported bushing therein, and outwardly opening, inwardly closing check valves for opening and closing the ports in the bushing, said check valves being arranged between the bushing and the sleeve so as to be protected by the sleeve when the device is lowered into a well.

KENNETH H. SWART.